US007519396B2

(12) United States Patent
Hashimoto

(10) Patent No.: US 7,519,396 B2
(45) Date of Patent: Apr. 14, 2009

(54) INTEGRATED CIRCUIT PACKAGE

(75) Inventor: Takashi Hashimoto, Ashiya (JP)

(73) Assignee: Panasonic Corporation, Osaka (JP)

( * ) Notice: Subject to any disclaimer, the term of this patent is extended or adjusted under 35 U.S.C. 154(b) by 561 days.

(21) Appl. No.: 11/182,556

(22) Filed: Jul. 15, 2005

(65) Prior Publication Data

US 2006/0019711 A1 Jan. 26, 2006

(30) Foreign Application Priority Data

Jul. 23, 2004 (JP) ............................ 2004-215238

(51) Int. Cl.
*H04M 1/00* (2006.01)
*H04B 7/14* (2006.01)
*H04B 15/00* (2006.01)
*H01Q 21/00* (2006.01)

(52) U.S. Cl. .................. 455/562.1; 455/25; 455/575.7; 455/63.4; 343/893; 343/758

(58) Field of Classification Search ............. 455/562.1, 455/13.3, 19, 25, 63.4, 82, 83, 575.7, 121, 455/129, 193.1, 279.1; 343/751, 757, 758, 343/810, 826, 853, 876, 879, 893
See application file for complete search history.

(56) References Cited

U.S. PATENT DOCUMENTS 7,236,750 B2 * 6/2007 Vaidyanathan et al. ........ 455/84

OTHER PUBLICATIONS

Brian A. Floyd et al., Intra-Chip Wireless Interconnect for Clock Distribution Implemented with Integrated Antennas, Receivers, and Transmitters, IEEE Journal of Solid-State Circuits, vol. 37, No. 5, May 2002, pp. 543-552.

* cited by examiner

*Primary Examiner*—Eugene Yun

(57) ABSTRACT

The integrated circuit package according to the present invention comprises: a plurality of functioning units operable to perform processing on input data and output a result of the processing; a plurality of antenna units each of which is positioned to (i) receive radio-transmitted data from at least another one of the plurality of antenna units by radio and (ii) transmit data to at least another one of the plurality of antenna units by radio; a first switching unit operable to selectively connect output of a first functioning unit, which is one of the plurality of functioning units, and a first antenna unit, which is one of the plurality of antenna units; and a second switching unit operable to selectively connect a second antenna unit, which is positioned to receive the radio-transmitted data from the first antenna unit by radio, and input of a second functioning unit different from the first functioning unit.

3 Claims, 8 Drawing Sheets

FIG.2

| SWITCHING UNIT | FUNCTIONING UNIT | ANTENNA UNIT | POSITIONAL INFORMATION | DIRECTIVITY INFORMATION |
|---|---|---|---|---|
| SWITCHING UNIT 11 | FUNCTIONING UNIT 3 | ANTENNA UNIT 21 | (x0,y0) | (x,0) |
| | | ANTENNA UNIT 22 | (x1,y0) | (−y,0) |
| SWITCHING UNIT 12 | FUNCTIONING UNIT 4 | ANTENNA UNIT 23 | (x2,y0) | (±x,0) |
| | | ANTENNA UNIT 24 | (x3,y0) | (−y,0) |
| SWITCHING UNIT13 | FUNCTIONING UNIT 5 | ANTENNA UNIT 25 | (x4,y0) | (−x,0) |
| | | ANTENNA UNIT 26 | (x5,y0) | (−y,0) |
| SWITCHING UNIT 14 | FUNCTIONING UNIT 6 | ANTENNA UNIT 27 | (x0,y1) | (x,0) |
| | | ANTENNA UNIT 28 | (x1,y1) | (y,0) |
| SWITCHING UNIT 15 | FUNCTIONING UNIT 7 | ANTENNA UNIT29 | (x2,y1) | (±x,0) |
| | | ANTENNA UNIT 30 | (x3,y1) | (y,0) |
| SWITCHING UNIT 16 | FUNCTIONING UNIT 8 | ANTENNA UNIT 31 | (x4,y1) | (−x,0) |
| | | ANTENNA UNIT 32 | (x5,y1) | (y,0) |

INTEGRATED CIRCUIT PACKAGE

BACKGROUND OF THE INVENTION

1. Field of the Invention

The present invention relates to an integrated circuit package including multiple functioning units, in particular to a technology for linking the multiple functioning units by radio connections.

2. Description of the Related Art

At present, in system LSIs (Large Scale Integration) and other integrated circuit packages including multiple functioning units, the respective functioning units are generally linked by wired connections.

However, there is a problem that, as the number of the functioning units becomes greater, the wiring increases in length as well as complexity and comes to occupy much of the area in the integrated circuit, which results in an increase in the size of the circuit.

In order to solve this problem, studies have been made on intra-chip radio communication where the functioning units in an integrated circuit package are linked by radio connections.

SUMMARY OF THE INVENTION

For example, it is considered to set up an integrated antenna unit including small antennas and a feed circuit together with each functioning unit, and to link the functioning units by radio connections using radio waves to which some specific directivity have been assigned in order to avoid radio interference.

However, in this case, a radio communication path among the functioning units is fixed due to the positions of the functioning units as well as the positions and directivity of the antenna units each set up together with the respective functioning units. This may lead to restrictions on the degrees of freedom in designing an integrated circuit.

Accordingly, the present invention aims at offering an integrated circuit package capable of flexibly changing a radio communication path among the functioning units.

In order to accomplish the above objective, the integrated circuit package according to the present invention comprises: a plurality of functioning units operable to perform processing on input data and output a result of the processing; a plurality of antenna units each of which is positioned to (i) receive radio-transmitted data from at least another one of the plurality of antenna units by radio and (ii) transmit data to at least another one of the plurality of antenna units by radio; a first switching unit operable to selectively connect output of a first functioning unit, which is one of the plurality of functioning units, and a first antenna unit, which is one of the plurality of antenna units; and a second switching unit operable to selectively connect a second antenna unit, which is positioned to receive the radio-transmitted data from the first antenna unit by radio, and input of a second functioning unit different from the first functioning unit.

The integrated circuit package with the above structure enables data, which is output from at least one of the functioning units, to be input to a desired functioning unit via one of the antenna units by switching connection/disconnection between the antenna units and functioning units, in other words, it is capable of changing a radio communication path among the functioning units, which provides the degrees of freedom in designing an integrated circuit.

Here, in the above integrated circuit package, each of the plurality of antenna units may include an antenna having directivity in a specific direction. Additionally, the integrated circuit package further comprises a switching configuration unit operable to store property information indicating the directivity of each antenna, positional information indicating a position of each of the plurality of antenna units, and data flow information indicating a flow of data among the plurality of functioning units. The switching configuration unit directs the first and the second switching units to perform the selective connections based on the property information, the positional information and the data flow information.

According to the structure, since each antenna unit has specific directivity, the integrated circuit package of the present invention is capable of statically or dynamically switching connection/disconnection between the functioning units and antenna units based on the positional information, property information and data flow information so that radio waves transmitted from the respective antennas do not crosstalk with each other. In addition, the dynamic switching allows space in the same direction to be used for a radio communication path among multiple functioning units.

Here, in the above integrated circuit package, the plurality of functioning units may be implemented by a programmable logic device.

Herewith, when each functioning unit is reconfigured, the radio communication path can also be changed in response to the reconfiguration.

Here, in the above integrated circuit package, the plurality of antenna units may be disposed at outer edges of where the plurality of functioning units is disposed.

Herewith, it is possible to minimize incidents of radio waves transmitted from the respective antenna units passing over each functioning unit, which reduces the chance of the radio waves exerting an adverse effect on the functioning units. On the other hand, this prevents each functioning unit from being a hindrance on the radio communication path.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows an example of an information table;

DESCRIPTION OF THE PREFERRED EMBODIMENT

A preferred embodiment of the present invention is described below with the aid of the drawings.

1. Structure

Figure 1:
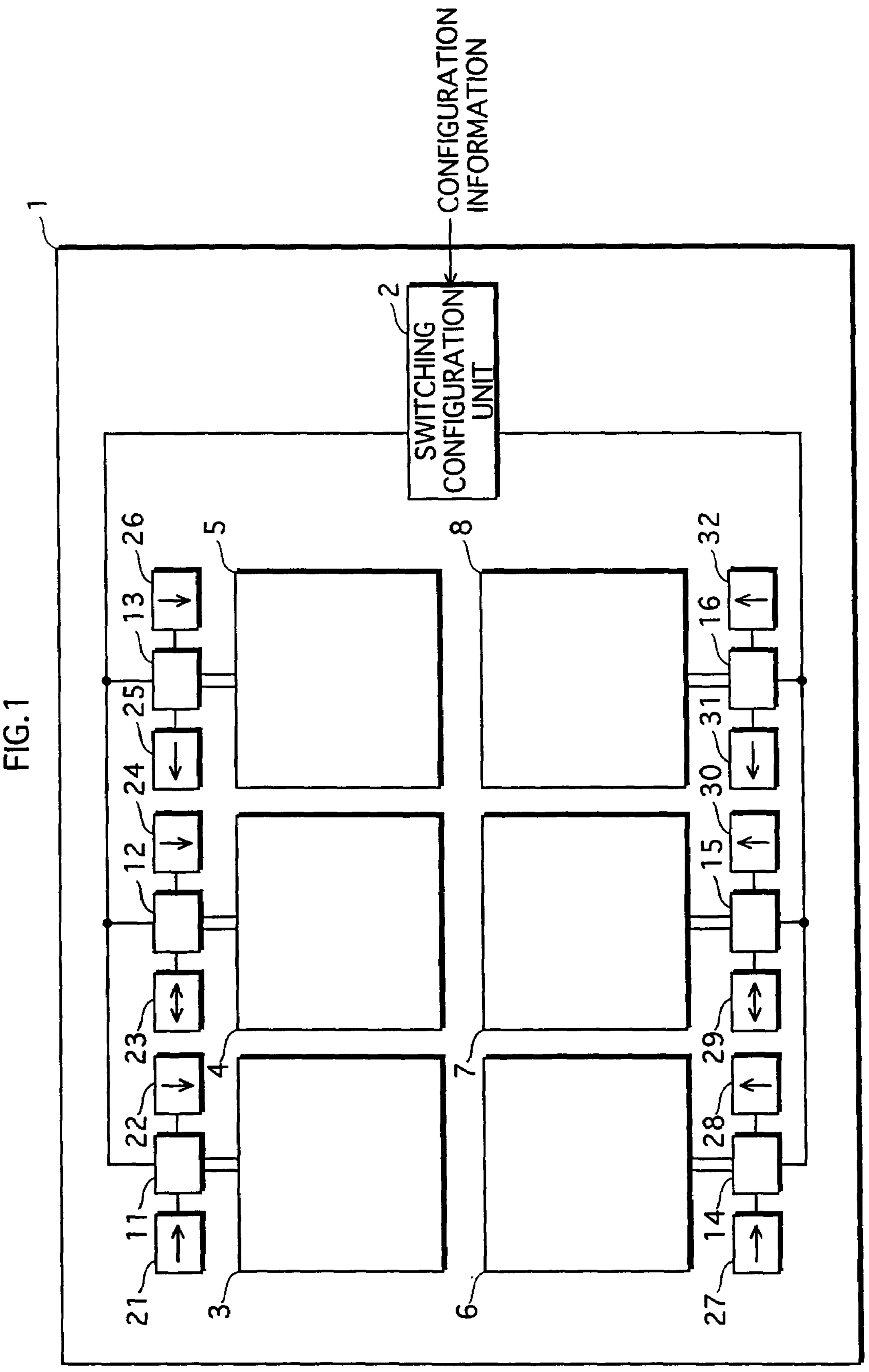
FIG. 1 is a schematic layout of an integrated circuit package 1 in plane view.

FIG. 1 is a schematic layout of an integrated circuit package 1 in plane view.

The integrated circuit package 1 comprises a switching configuration unit 2, functioning units 3 to 8, switching units 11 to 16 and antenna units 21 to 32.

The integrated circuit package 1 is an FPGA (Field-Programmable Gate Array), and reconfigures the function details of each functioning unit 3 to 8 by getting connected to an external device such as a PC (Personal Computer) and loading configuration data therefrom.

The switching configuration unit 2 is internally provided with memory (not shown in the figure), in which an information table as shown in FIG. 2 is stored.

FIG. 2 shows an information table in which each switching unit provided in the integrated circuit package 1 corresponds to a functioning unit and antenna units whose connection states (i.e. connected or disconnected) can be changed by the switching unit, and positional information and directional information of each of the antenna units.

The information table shown in FIG. 2 indicates, for example, that the connection state of the functioning unit 3 with each of the antenna units 21 and 22 can be changed by the switching unit 11 while the antenna directivity of the antenna unit 21 is in the x direction (a direction to the right in FIG. 1).

When the integrated circuit package 1 is connected to the external device, the switching configuration unit 2 accepts input of configuration information for configuring switching of the connection and disconnection between the respective functioning units and antenna units from the external device, stores the configuration information in the memory, and transmits, to each switching unit linked by wire, a connection-state-switch directing signal that directs switching of the connection/disconnection between a functioning unit and its corresponding antenna units based on the configuration information and the information table.

The switching unit 11 is connected to the antenna units 21 and 22 and the functioning unit 3 by wire.

The switching unit 12 is connected to the antenna units 23 and 24 and the functioning unit 4 by wire.

The switching unit 13 is connected to the antenna units 25 and 26 and the functioning unit 5 by wire.

The switching unit 14 is connected to the antenna units 27 and 28 and the functioning unit 6 by wire.

The switching unit 15 is connected to the antenna units 29 and 30 and the functioning unit 7 by wire.

The switching unit 16 is connected to the antenna units 31 and 32 and the functioning unit 8 by wire.

Figure 3:
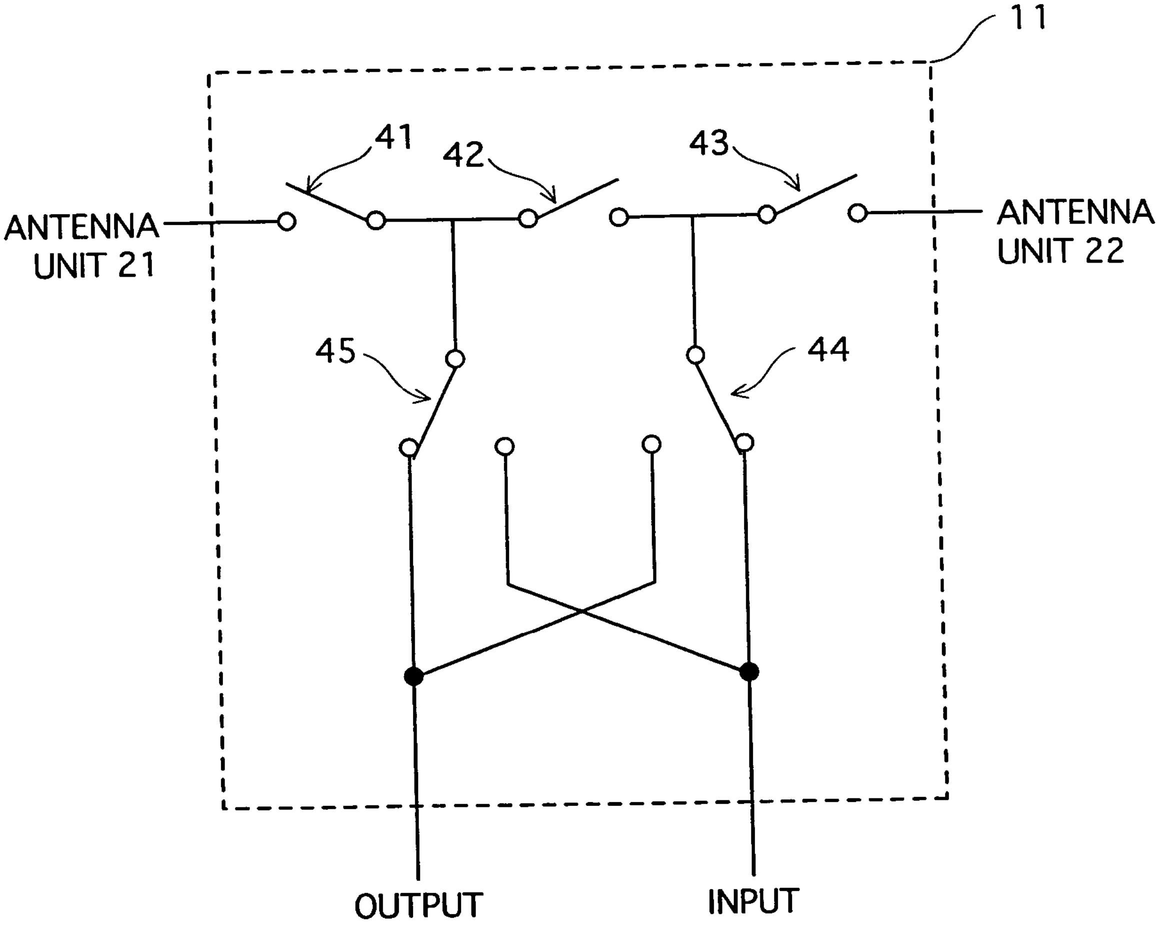
FIG. 3 shows a structure of a switching unit 11.

FIG. 3 shows a structure of the switching unit 11.

The switching unit 11 is composed of switch circuits 41 to 45.

Each of the switch circuits 41 to 43 is a circuit for performing switching between two modes—on and off, while each of the switch circuits 44 and 45 is a circuit for performing switching over three modes—connected to an output terminal of the functioning unit 3, connected to an input terminal of the functioning unit 3, and disconnected from both terminals.

For example, when a connection-state-switch directing signal is send from the switching configuration unit 2 to the switching unit 11 so as to transmit the output of the functioning unit 3 from the antenna unit 21 by radio, the switching unit 11 connects the switch circuit 45 to the output terminal of the functioning unit 3 and sets the switch circuit 41 to the "on" mode.

The switching units 12 to 16 have the same structure as the switching unit 11 above, and therefore their descriptions are omitted here.

The antenna units 21 to 32 respectively have antennas each having specific directivity. The direction of an arrow in each antenna unit shown in FIG. 1 represents the antenna directivity of the antenna unit.

The antenna units 21 and 22, whose connection states with the functioning unit 3 can be respectively changed by the switching unit 11, are positioned close to the functioning unit 3.

The antenna units 23 and 24, whose connection states with the functioning unit 4 can be respectively changed by the switching unit 12, are positioned close to the functioning unit 4.

The antenna units 25 and 26, whose connection states with the functioning unit 5 can be respectively changed by the switching unit 13, are positioned close to the functioning unit 5.

The antenna units 27 and 28, whose connection states with the functioning unit 6 can be respectively changed by the switching unit 14, are positioned close to the functioning unit 6.

The antenna units 29 and 30, whose connection states with the functioning unit 7 can be respectively changed by the switching unit 15, are positioned close to the functioning unit 7.

The antenna units 31 and 32, whose connection states with the functioning unit 8 can be respectively changed by the switching unit 16, are positioned close to the functioning unit 8.

Figure 8:
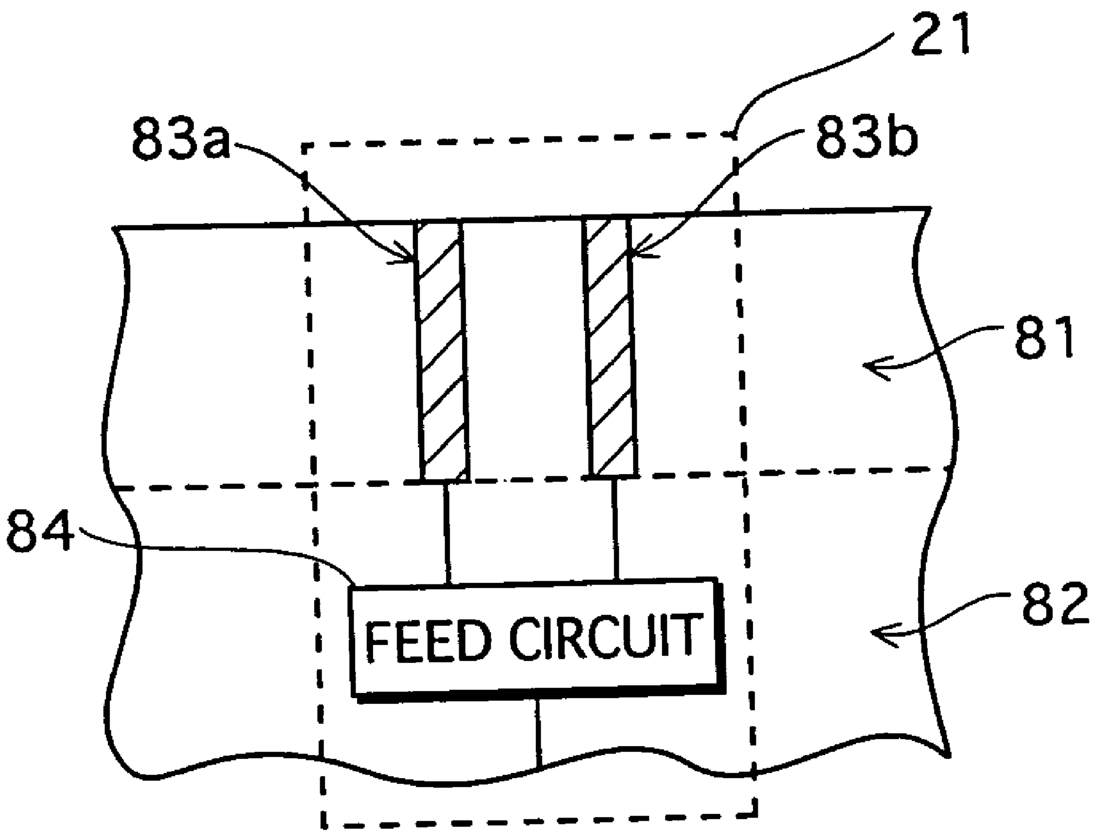
FIG. 8 is a schematic partial cross section of the vicinity of an antenna unit 21 in the integrated circuit package 1.

FIG. 8 is a schematic partial cross section of the vicinity of the antenna unit 21 in the integrated circuit package 1.

The antenna unit 21 comprises antennas 83*a* and 83*b* and a feed circuit 84.

The antennas 83*a* and 83*b* are long conductor strips, and are formed within an insulating layer 81, parallel to each other in a direction perpendicular to the main surface of the integrated circuit package 1. That is to say, they are so-called microstrip antennas.

The feed circuit 84 is formed in a silicon layer 82, and supplies power to the antenna 83*a* to be thereby a radiating element while supplying no power to the antenna 83*b* to be thereby a wave director. Herewith, the antenna unit 21 obtains the antenna directivity in the x direction (a direction to the right in FIGS. 1 and 8).

The antenna units 22 to 32 all have the same structure as the antenna unit 21 above, although each having different directivity, and therefore their descriptions are omitted here.

Note that the antenna units 23 and 29 respectively have the antenna directivity in the direction of ±x (directions to the right and left in FIG. 1), which is achieved by switching the directivity of a pair of two antennas by supplying power to one of the two and not to the other.

2. Operations

Here is described an example of specific operations of the integrated circuit package 1.

The integrated circuit package 1 loads configuration data from the external device to thereby reconfigure the respective functioning units 3 to 8 into functioning units performing the following processes, and conducts video coding/decoding processing: the functioning unit 3 into a functioning unit performing image input filtering; the functioning unit 4 into a functioning unit performing image output filtering; the functioning unit 5 into a functioning unit performing motion detection/motion compensation; the functioning unit 6 into a functioning unit performing quantization/dequantization; the functioning unit 7 into a functioning unit performing variable length coding/variable length decoding; and the functioning unit 8 into a functioning unit performing discrete cosine transform (referred to hereinafter as "DCT")/inverse discrete cosine transform ("IDCT").

Figure 4:
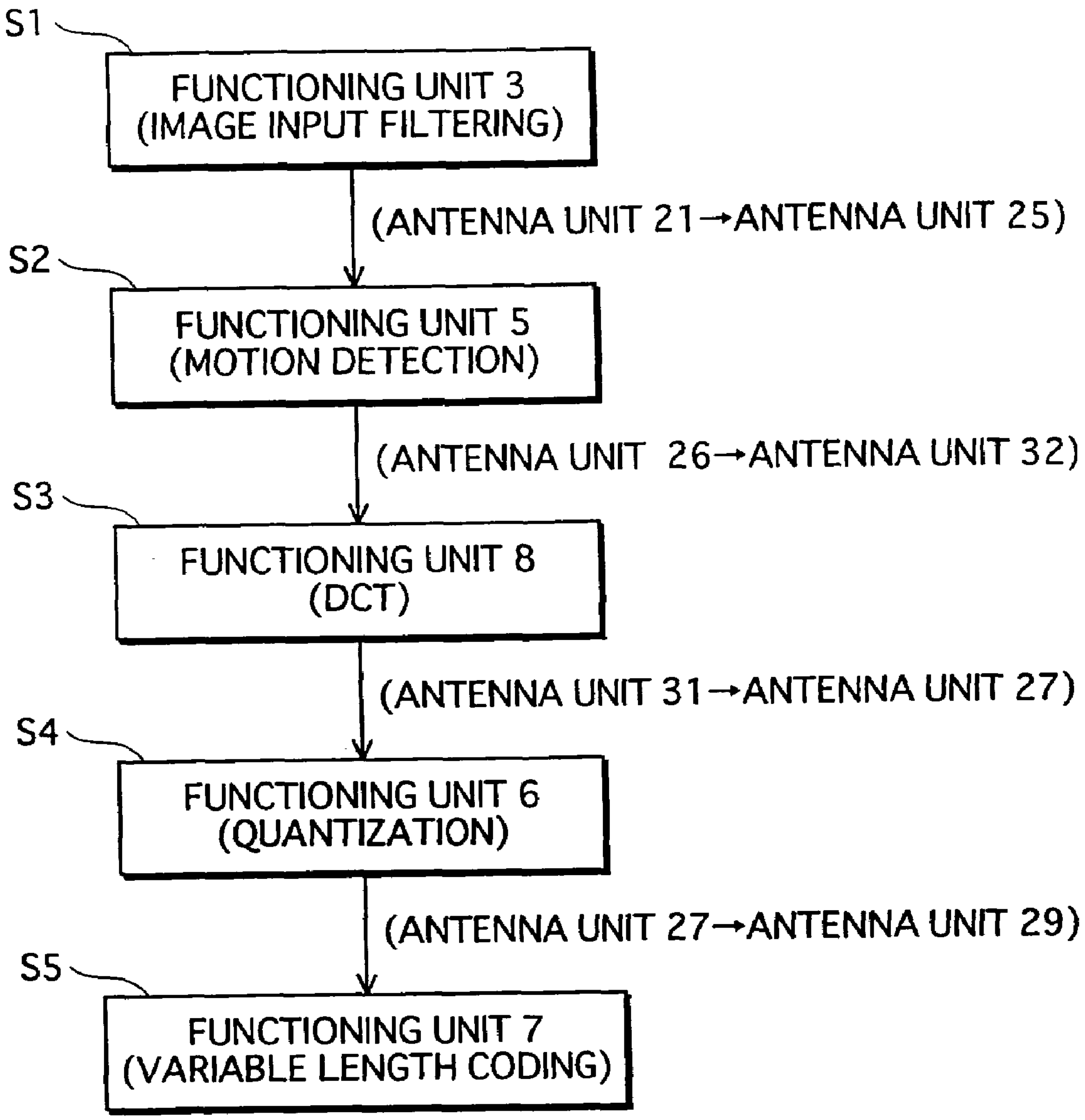
FIG. 4 shows a data flow among functioning units in video coding processing.

FIG. 4 shows a data flow among the functioning units in the video coding processing.

First, the functioning unit 3 performs a filtering process for improving image quality of coding target video data that is input from an outside source (Step S1). Data, after the filtering process, is transmitted to the functioning unit 5 by radio.

Then, the functioning unit 5 performs a motion detection process on images contained in the filtering-processed data (Step S2). Data, after the motion detection process, is transmitted to the functioning unit 8 by radio.

The functioning unit 8 performs a DCT process on difference data obtained by the motion detection process (Step S3). Data, after the DCT process, is transmitted to the functioning unit 6 by radio.

The functioning unit 6 performs a quantization process on transformation coefficient data obtained by the DCT process (Step S4). Data, after the quantization process, is transmitted to the functioning unit 7 by radio.

The functioning unit 7 performs a variable length coding process on the quantized transformation coefficient data after the quantization process (Step S5).

The user creates configuration information for the video coding processing based on the data flow from Steps S1 to S5 described above, and inputs this to the switching configuration unit 2 via an external device.

The input configuration information is, specifically speaking, information indicating that output data of the functioning unit 3 is to be input to the functioning unit 5, output data of the functioning unit 5 is to be input to the functioning unit 8, output data of the functioning unit 8 is to be input to the functioning unit 6, and output data of the functioning unit 6 is to be input to the functioning unit 7.

The switching configuration unit 2 transmits the following connection-state-switch directing signals to the respective switching unit 11, 12, 13, 15 and 16 based on the input configuration information and the pre-stored information table. The connection-state-switch directing signal transmitted to the switching unit 11 is for connecting the output of the functioning unit 3 to the antenna unit 21 and disconnecting the input and output of the functioning unit 3 from the antenna unit 22. The connection-state-switch directing signal transmitted to the switching unit 12 is for disconnecting the input and output of the functioning units 4 from both the antenna units 23 and 24. The connection-state-switch directing signal transmitted to the switching unit 13 is for connecting the input of the functioning unit 5 to the antenna unit 25 and connecting the output of the functioning unit 5 to the antenna unit 26. The connection-state-switch directing signal transmitted to the switching unit 16 is for connecting the input of the functioning unit 8 to the antenna unit 32 and connecting the output of the functioning unit 8 to the antenna unit 31. The connection-state-switch directing signal transmitted to the switching unit 15 is for connecting the input of the functioning unit 7 to the antenna unit 29.

Additionally, the switching configuration unit 2 alternately transmits, to the switching unit 14 at a predetermined timing, a connection-state-switch directing signal for connecting the input of the functioning unit 6 to the antenna unit 27 and a connection-state-switch directing signal for connecting the output of the functioning unit 6 to the antenna unit 27 so that the connections between the input and output of the functioning unit 6 and the antenna unit 27 are dynamically switched.

Figure 5:
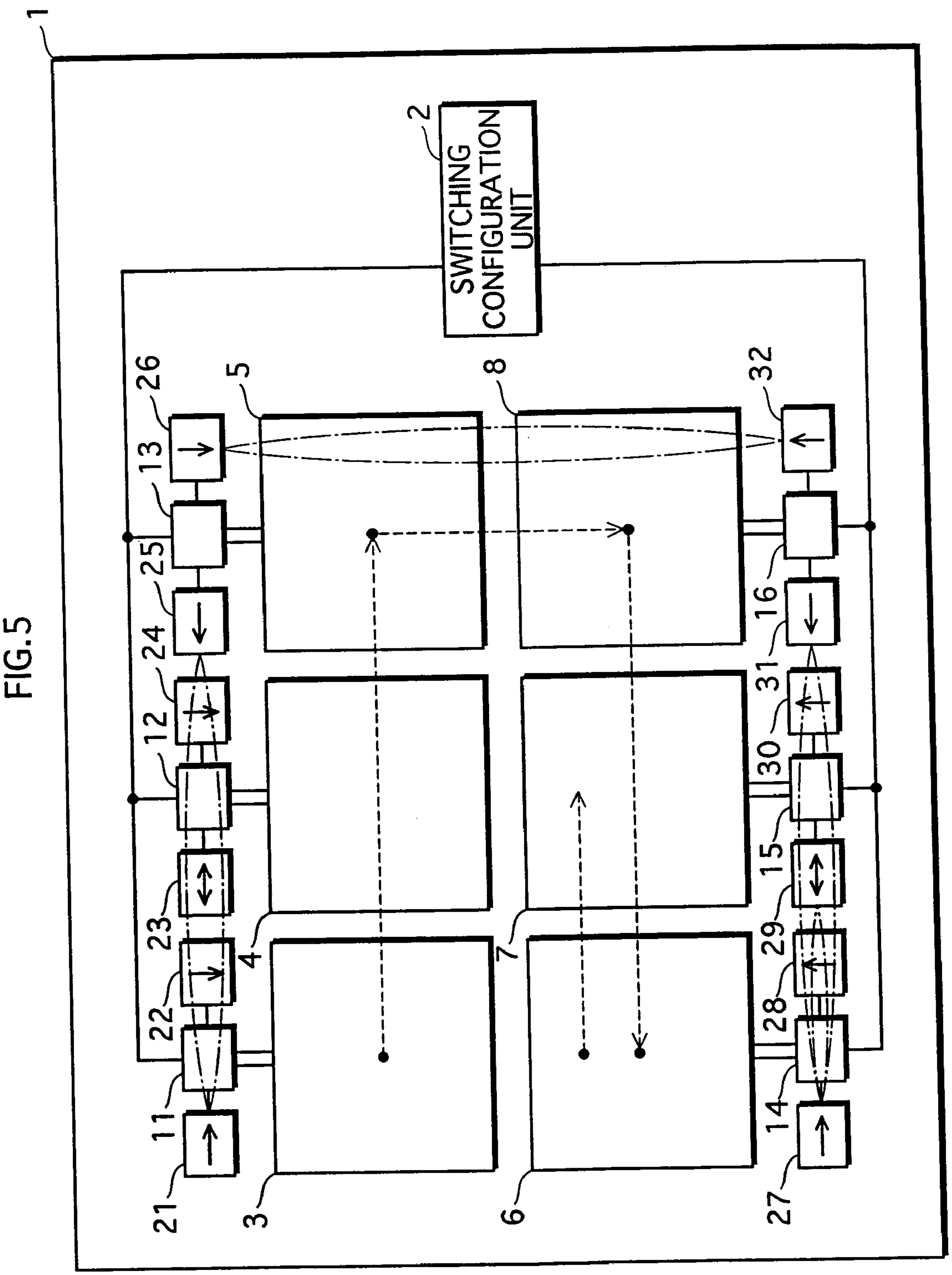
FIG. 5 shows a flow of data transmitted by radio in the video coding processing.

FIG. 5 shows a flow of data transmitted by radio in the video coding processing. Dotted arrows in the figure represent a flow of data among the functioning units.

Next is described the video decoding processing.

Figure 6:
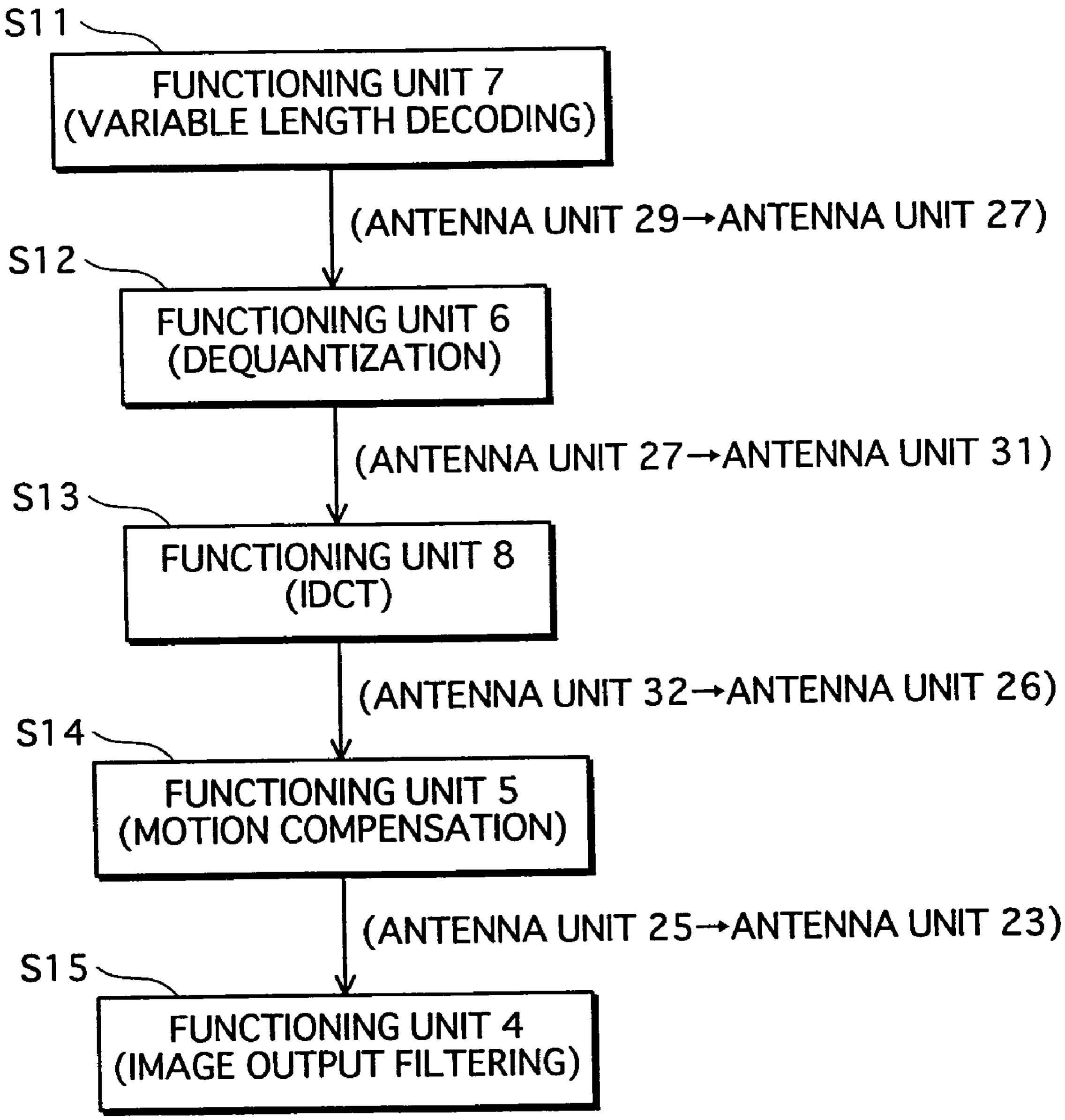
FIG. 6 shows a data flow among the functioning units in video decoding processing.

FIG. 6 shows a data flow among the functioning units in the video decoding processing.

First, the functioning unit 7 performs a variable length decoding process on a variable length coded bitstream, which is input from an outside source, to obtain coding parameters and quantized transformation coefficient data (Step S11). Data, after the variable length decoding process, is transmitted to the functioning unit 6 by radio.

Then, the functioning unit 6 performs a dequantization process on the quantized transformation coefficient data obtained by the variable length decoding process (Step S12). Data, after the dequantization process, is transmitted to the functioning unit 8 by radio.

The functioning unit 8 performs an IDCT process on a transformation coefficient obtained by the dequantization process (Step S13). Data, after the IDCT process, is transmitted to the functioning unit 5 by radio.

The functioning unit 5 performs a motion compensation process for acquiring decoded images from difference image data obtained by the IDCT process and reference images (Step S14). Data, after the motion compensation process, is transmitted to the functioning unit 4 by radio.

The functioning unit 4 performs a filtering process on the decoded images obtained by the motion compensation process in order to improve the image quality (Step S15).

The user creates configuration information for the video decoding processing based on the data flow from Steps S11 to S15 described above, and inputs this to the switching configuration unit 2 via an external device, as in the case of the above-mentioned video coding processing.

The input configuration information is, specifically speaking, information indicating that output data of the functioning unit 7 is to be input to the functioning unit 6, output data of the functioning unit 6 is to be input to the functioning unit 8, output data of the functioning unit 8 is to be input to the functioning unit 5, and output data of the functioning unit 5 is to be input to the functioning unit 4.

The switching configuration unit 2 transmits the following connection-state-switch directing signals to the respective switching unit 11, 12, 13, 15 and 16 based on the input configuration information and the pre-stored information table. The connection-state-switch directing signal transmitted to the switching unit 11 is for disconnecting the input and output of the functioning unit 3 from both the antenna units 21 and 22. The connection-state-switch directing signal transmitted to the switching unit 12 is for connecting the input of the functioning unit 4 to the antenna unit 23 and disconnecting the input and output of the functioning units 4 from the antenna unit 24. The connection-state-switch directing signal transmitted to the switching unit 15 is for connecting the output of the functioning unit 7 to the antenna unit 29 and disconnecting the input and output of the functioning unit 7 from the antenna unit 30. The connection-state-switch directing signal transmitted to the switching unit 16 is for connecting the input of the functioning unit 8 to the antenna unit 31 and connecting the output of the functioning unit 8 to the antenna unit 32. The connection-state-switch directing signal transmitted to the switching unit 13 is for connecting the input of the functioning unit 5 to the antenna unit 26 and connecting the output of the functioning unit 5 to the antenna unit 25.

Additionally, the switching configuration unit 2 alternately transmits, to the switching unit 14 at a predetermined timing, a connection-state-switch directing signal for connecting the input of the functioning unit 6 to the antenna unit 27 and a connection-state-switch directing signal for connecting the output of the functioning unit 6 to the antenna unit 27 so that the connections between the input and output of the functioning unit 6 and the antenna unit 27 are dynamically switched.

Figure 7:
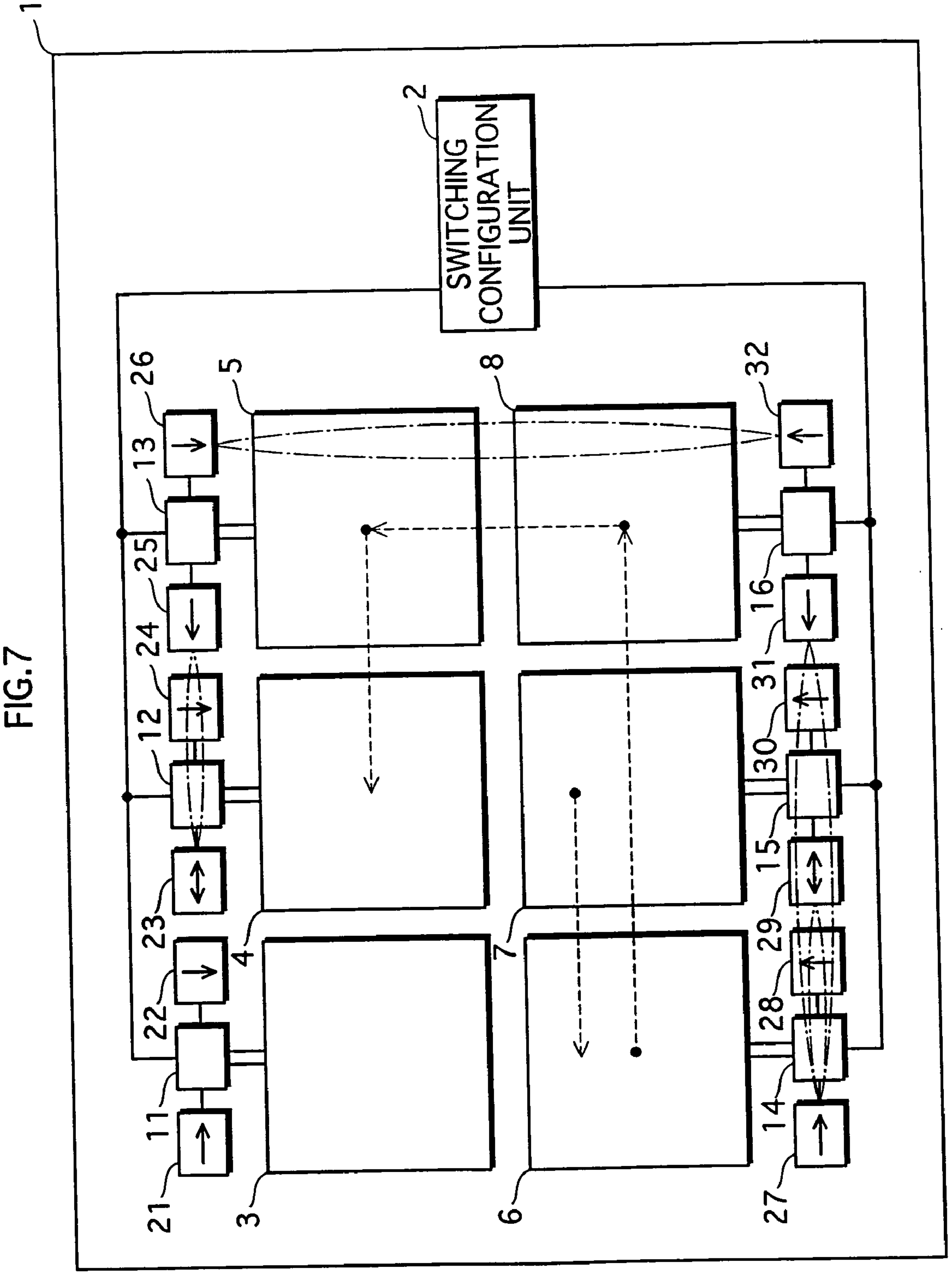
FIG. 7 shows a flow of data transmitted by radio in the video decoding processing.

FIG. 7 shows a flow of data transmitted by radio in the video decoding processing. Dotted arrows in the figure represent a flow of data among the functioning units.

As has been described, the integrated circuit package 1 is capable of flexibly changing a radio communication path among the functioning units.

3. Additional Particulars

It goes without saying that the present invention is not confined to the above-mentioned embodiment, and the following is also included in the present invention.

[1] The present invention is applicable not only to FPGAs but also to other programmable LSIs, or to nonprogrammable, common LSIs. In addition, the present invention may be applied to only part of the integrated circuit package.

[2] When a new technology for integrated circuits that takes over the current semiconductor technology is introduced as a result of progress in the semiconductor technology or by semiconductor-derived technologies, the present invention can be applied to an integrated circuit package in which functional blocks are integrated by using such a newly launched technology.

[3] According to the above embodiment, data which is output from the functioning unit 3 can be input to the functioning unit 8. Specifically speaking, this is achieved by: connecting the output of the functioning unit 3 to the antenna unit 21 by the switching unit 11; connecting the antenna units 24 and 26 to one another by the switching unit 13; and connecting the antenna unit 32 and the input of the functioning unit 8 by the switching unit 16, or, alternatively, by: connecting the output of the functioning unit 3 to the antenna unit 22 by the switching unit 11; connecting the antenna units 28 and 27 by the switching unit 14; and then connecting the antenna 31 to the input of the functioning unit 8 by the switching unit 16.

[4] Although microstrip antennas are used in the above embodiment, directional antennas having other structures may be applied, instead.

[5] Although, in the above embodiment, the integrated circuit package 1 loads the configuration data in response to a direction from an external device, such as a PC, the present invention is not confined to this case. For example, the integrated circuit package 1 may internally have a control function to load the configuration data, and may load the configuration data from an external memory storing it, according to the control function.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. An integrated circuit package comprising:

a plurality of functioning units operable to perform processing on input data and output a result of the processing;

a plurality of antenna units each of which (a) is positioned to (i) receive radio-transmitted data from at least another one of the plurality of antenna units by radio and (ii) transmit data to at least another one of the plurality of antenna units by radio, (b) includes an antenna having directivity in a specific direction;

a first switching unit configured to selectively connect output of a first functioning unit, which is one of the plurality of functioning units, and a first antenna unit, which is one of the plurality of antenna units;

a second switching unit configured to selectively connect a second antenna unit, which is positioned to receive the radio-transmitted data from the first antenna unit by radio, and input of a second functioning unit different from the first functioning unit; and a switching configuration unit configured to store property information indicating the directivity of each antenna, positional information indicating a position of each of the plurality of antenna units, and data flow information indicating a flow of data among the plurality of functioning units, and direct the first and the second switching units to perform the selective connections based on the property information, the positional information and the data flow information.

2. The integrated circuit package of claim 1, wherein a connection structure of the plurality of functioning units is implemented by a programmable logic device.

3. The integrated circuit package of claim 1, wherein the plurality of antenna units is disposed at outer edges of where the plurality of functioning units is disposed.

* * * * *